United States Patent [19]

Schafbuch

[11] Patent Number: 4,767,138
[45] Date of Patent: Aug. 30, 1988

[54] HUBLESS FLANGE

[75] Inventor: Paul J. Schafbuch, Melbourne, Iowa

[73] Assignee: Fisher Controls International, Inc., Marshalltown, Iowa

[21] Appl. No.: 762,033

[22] Filed: Aug. 2, 1985

Related U.S. Application Data

[63] Continuation of Ser. No. 714,973, Mar. 22, 1985, abandoned, which is a continuation of Ser. No. 373,330, Apr. 23, 1982, abandoned.

[51] Int. Cl.$^4$ ............................................. F16L 19/02
[52] U.S. Cl. ..................................... 285/368; 285/414
[58] Field of Search .............. 285/368, 412, 413, 363, 285/414, 415, DIG. 7

[56] References Cited

U.S. PATENT DOCUMENTS

| | | | |
|---|---|---|---|
| 304,650 | 9/1884 | Jarecki | 285/414 |
| 580,058 | 4/1887 | Rockwood . | |
| 1,662,954 | 3/1928 | Broido et al. . | |
| 2,568,414 | 9/1951 | Russ | 285/414 X |
| 2,712,438 | 7/1955 | Brown . | |
| 3,065,000 | 11/1962 | Stanton | 285/368 X |
| 3,652,110 | 3/1972 | Maston | 285/328 |
| 3,656,769 | 4/1972 | Jelinek et al. | 277/207 |
| 3,752,509 | 8/1973 | Stafford | 285/334.4 |
| 3,771,817 | 11/1973 | Schnabel | 285/55 |
| 3,942,141 | 3/1976 | Kaffenberger | 333/98 R |
| 4,000,921 | 1/1977 | Daspit | 285/336 |
| 4,155,571 | 5/1979 | Gastineau et al. | 285/24 |
| 4,168,853 | 9/1979 | Ahlstone | 285/336 |
| 4,268,070 | 5/1981 | Adams | 285/15 |

FOREIGN PATENT DOCUMENTS

| | | | |
|---|---|---|---|
| 2242969 | 3/1973 | Fed. Rep. of Germany | 285/368 |
| 402415 | 11/1933 | United Kingdom | 285/414 |
| 1403671 | 8/1975 | United Kingdom . | |

Primary Examiner—Dave W. Arola
Attorney, Agent, or Firm—Dale A. Kubly; Nicholas A. Camasto

[57] ABSTRACT

A hubless flange for a valve body has a cross section which tapers outwardly with radial distance from the center line of the flange for radially equalizing the tangential stress for annular fibers in the flange. The flange includes a plurality of bolt holes and strengthened areas of increased cross section surrounding the bolt holes which also serve as load bearing surfaces for mounting bolts.

13 Claims, 2 Drawing Sheets

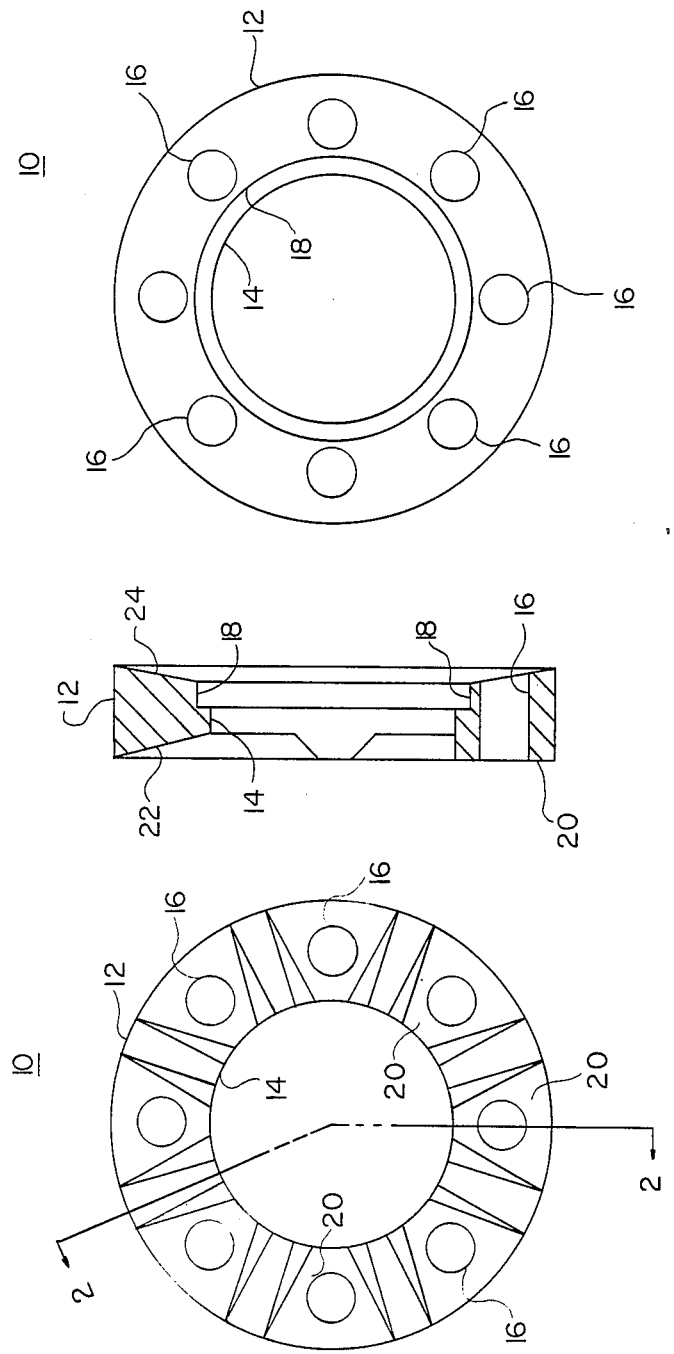

HUBLESS FLANGE

This application is a continuation of application, Ser. No. 714,973 filed on Mar. 22, 1985, now abandoned, which is a continuation of application, Ser. No. 373,330 filed on Apr. 23, 1982, now abandoned.

FIELD OF THE INVENTION

This invention relates generally to hubless flanges and specifically to hubless flanges for valve bodies in corrosive service applications.

BACKGROUND OF THE INVENTION AND PRIOR ART

Flanges, which are well known in the art, are generally required in installations having conduit or pipes for connecting valves, pumps, meters or other equipment which may require periodic servicing or replacement. Many flanges are formed integrally with the valve or pump. Those of concern in the instant invention are of the hubless type which are removably mounted to the valve, pump or other equipment. The particular method of mounting the hubless flange to the equipment is not part of the present invention.

Hubless (replaceable) flanges are especially useful since they lend a great deal of versatility to expensive equipment by enabling use of such equipment in a number of different mounting arrangements. Consequently use of different size flanges and bolt hole configurations is economically advantageous to both the manufacturer and the user. For example, a hubless flange enables use of a valve in a number of different types of pipeline installations by simply replacing the flange on the valve body.

Another advantage accrues where the material from which the equipment is fabricated is especially expensive or, as is quite common, is of limited strength and durability not suitable for the rough treatment and forces encountered during installation or removal. The flange may be constructed of extremely durable material and coupled to the body of the equipment by means of a split key arrangement or the like and, therefore, be substantially immunized from the adverse effects of installation and removal.

Hubless flanges are generally annular or ring-shaped and of substantially rectangular cross section. The type of material and actual dimensions of the flange are, of course, dependent upon its intended service and the accompanying stresses and strains to which it will be subject. In corrosive environments involving pressures up to about 1400 p.s.i., flanges may be made of high quality metals such as CF8M stainless steel or WCB carbon steel. Such materials can be expensive and there is a definite need to make flanges using them cost effective, that is capable of meeting service specifications with a minimum amount of material. The present invention teaches a hubless flange construction and design which yields substantial savings in material for equivalent performance over prior art hubless flanges. As will be seen, the tangential stress in the material is critical. In a ring shaped flange, these stresses are directed tangentially to annular fibers in the flange and perpendicular to the conventional forces applied during clamping.

SUMMARY OF THE INVENTION

The principal object of this invention is to provide an improved hubless flange for valve bodies or the like.

Another object of this invention is to provide a hubless flange requiring less material.

Accordingly, a hubless flange constructed in accordance with the invention has a cross section which increases as the distance from the flange center increases.

A feature of the invention resides in the tapered cross section of the hubless flange of the invention whereby the tangential stress for annular fibers of the flange is substantially radially equalized.

BRIEF DESCRIPTION OF THE DRAWINGS

The invention and its objects and advantages may best be understood from the following description taken in conjunction with the accompanying drawings, in the several figures of which like reference numerals identify like elements and in which:

FIG. 1 is a front elevation of a hubless flange constructed in accordance with the invention;

FIG. 2 is a cross section of the flange of FIG. 1 taken along the line 2—2;

FIG. 3 is a rear elevation of the flange of FIG. 1;

DESCRIPTION OF THE PREFERRED EMBODIMENT

Figure 5:
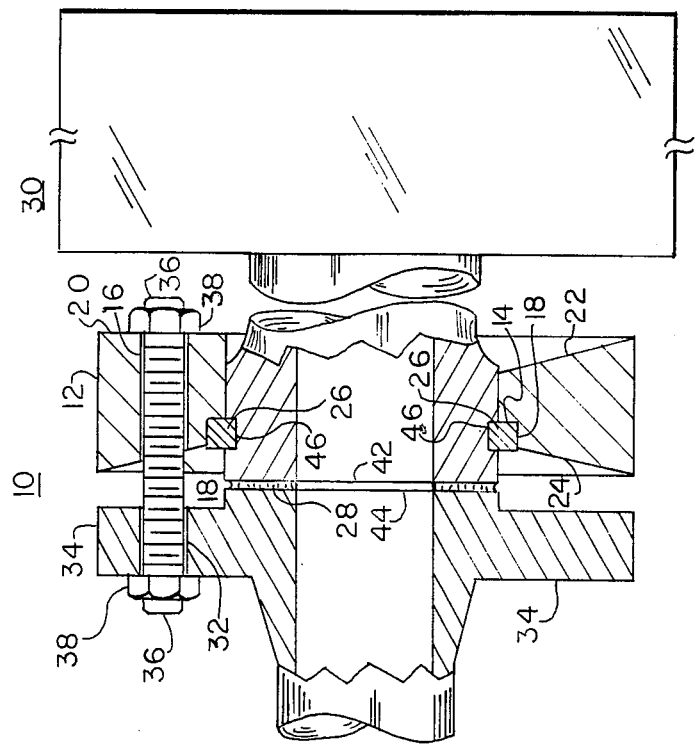
FIG. 5 is a partial cross section of a line flange coupled to a valve body using the hubless flange of the invention.

Reference is made to FIGS. 1, 2, and 3 of the drawings illustrating a hubless flange constructed in accordance with the teachings of the invention. Flange 10 is generally ring shaped and has a circular outer periphery 12 and a circular inner periphery 14. A plurality of mounting apertures or bolt holes 16 are uniformly disposed about the flange, with eight holes being illustrated. It will be understood by those skilled in the art that a lesser or greater number of mounting apertures may be incorporated depending upon the particular environment or application. As best seen in the upper portion of FIG. 2, the cross section between bolt holes is essentially trapezoidal in shape with a front taper 22 and a rear taper 24. Also seen in the lower portion of this figure is an area of increased cross section for strengthening about the mounting holes. As best illustrated in FIG. 3, a circular recess 18 is provided in the rear surface of the inner periphery of the flange for engagement with a split-key in a valve body. This key is the means by which forces exerted by the bolts in the mounting apertures of the hubless flange are applied to the valve body.

Figure 4:
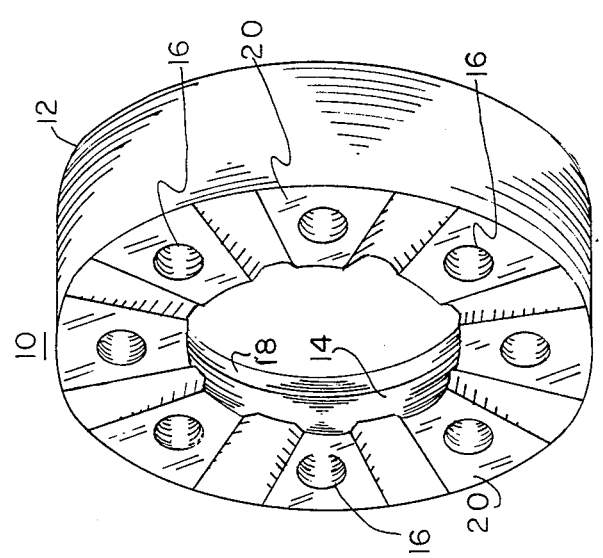
FIG. 4 is an enlarged perspective view of the flange of FIG. 1.

FIG. 4 more clearly illustrates the way in which the strengthened areas about the mounting holes are formed to provide surfaces 20, parallel to the plane of the flange, for the mounting bolts to bear against. It will be appreciated by those skilled in the art that considerable variation in the configuration of the strengthened areas around the mounting apertures may be made in accordance with the particular design or application criteria. The point to be made is that in an optimized design some material will be added to compensate for the flange material eliminated because of the presence of the mounting apertures. Since the flange's tapered cross section does not lend itself directly to application of forces normal to the plane of the flange (as applied conventionally by bolts and the like) flat mounting surfaces parallel to the plane of the flange are desirable. Consequently, proper configuration of the added material in the vicinity of the bolt holes solves both problems. However, as will be seen with reference to FIG. 6, there is an alternative for situations in which the stress or strain in the vicinity of the mounting apertures is not of critical importance.

FIG. 5 illustrates a cross section through a line flange 34 coupled to a valve body 30 incorporating the hubless flange of the invention. The line and the valve body are not shown in detail since they are not pertinent to the invention. The upper section is taken through a bolt hole and the lower section is taken between bolt holes to fully illustrate the construction. Valve body 30 is generally cylindrical in the area of a mating face 42, as is line flange 34 in the area of a mating face 44. A deformable gasket 28, of a composition suitable to the nature of the fluids or gases involved, is located between the mating faces to assure a good seal between the line and valve. Valve body 30 has a transversely disposed circular groove 46 parallel to mating face 42. A circular split key 26 of generally rectangular cross section is positioned within the circular groove and, in conjunction with recess 18 in hubless flange 10, enables flange 10 to exert forces on the valve body perpendicular to mating face 42 for compression of gasket 28. The split key also enables the flange to be removed from the flange body and replaced with another hubless flange having a similar inner periphery. The outer periphery of the replacement flange may, however, have an entirely different configuration, depending on the configuration of the flange to which it will be secured.

Line flange 34 is aligned with hubless flange 10 and includes a plurality of mounting holes 32 corresponding in number, size and location with mounting holes 16 in flange 10. A threaded stud 36, and associated nuts 38, through each corresponding pair of mounting holes forces the line flange and valve body together to compress gasket 28 and provide a seal.

Hubless flange 10 has the tapered configuration of the invention whereas flange 34 has a rectangular cross section. It will be noted that the taper or inclination of surfaces 22 and 24 of flange 10, is extended, would intersect at the flange center line. This is the ideal condition for minimum material utilization in a hubless flange of given performance characteristics. The flange may be made of CF8M stainless steel, WCB carbon steel, or other suitable material. Key 26 may be fabricated of a suitable steel material to enable the key to support the flange on the equipment. The valve body may be made of any suitable material. The flange may be investment cast with the finish desired.

Figure 6:
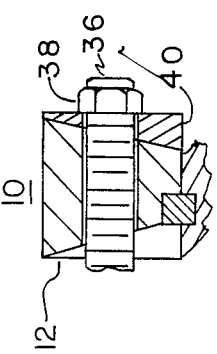
FIG. 6 is a partial view showing a modification of a portion of the flange construction illustrated in FIG. 5.

In FIG. 6, there is shown a partial section through a bolt hole of the flange illustrating a modified construction where the hubless flange is made with a uniform taper on both sides. To provide a flat loading surface for the clamping studs and nuts, a tapered adapter 40 is used. Adapter 40 is wedge-shaped with an angle selected to complement that of flange surface 22. The net result of adding the adapter to the flange is a flat surface parallel to the plane of the flange (and parallel to the mating surface of the valve body). This construction has the advantage of any extremely simple flange design. Its disadvantage is that it does not have the added material around the bolt holes. It is, however, still cost effective with respect to the amount of material used for any given set of design parameters.

The following mathematical analysis illustrates the basis of the invention and is believed exact. Yet it will be understood that the invention itself is not dependent upon the accuracy of the mathematics. The analysis is also based upon an ideal flange without bolt holes. For purposes of this analysis, consider the flange as axisymmetric ring twisted by a uniformly distributed couple (M). The deflection may be characterized as a rotation for cross sections with a thickness and width of similar magnitude. This rotation induces tangential strain ($\epsilon$) in the ring by changing the length of the annular fibers of the ring. (an annular fiber is a term well known in the art and refers to thin sections of material in the flange at different radial displacements from the center). This strain is defined by the following known equation:

$$\epsilon = \frac{\Delta L}{L} = \frac{2\pi \Delta r}{2\pi r} = \frac{\Delta r}{r} \tag{1}$$

Figure 7:
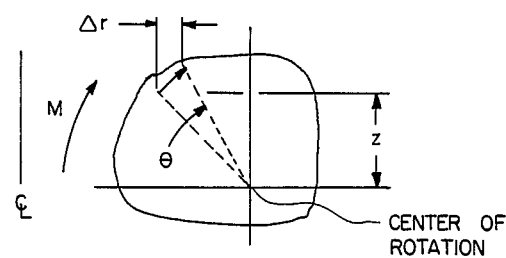
FIG. 7, FIG. 8 and FIG. 9 are representations used in conjunction with mathematical equations herein.

Also, the change in radius ($\Delta r$) for a small rotation ($\theta$) is defined geometrically in equation (2) (see FIG. 7):

$$\Delta r = Z\theta \tag{2}$$

Combining equations (1) and (2):

$$\epsilon = \frac{Z\theta}{r} \tag{3}$$

Therefore, according to Hooke's Law, the tangential stress ($\sigma$) is:

$$\sigma = E\epsilon = \frac{EZ\theta}{r} \tag{4}$$

where E is the modulus of elasticity.

And from statics, the internal moment (M) of the ring is:

$$M = \int_A \sigma Z dA \tag{5}$$

Figure 8:
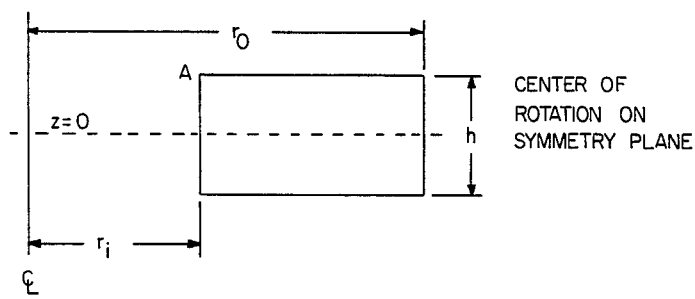

Now, for a flat ring having a rectangular cross section: (see FIG. 8).

Combining equations (4) and (5):

$$M = \int_{-h/2}^{h/2} \int_{r_i}^{r_o} \frac{E\theta Z^2}{r} dr dZ = \frac{E\theta h^3}{12} \ln \frac{r_o}{r_i} \tag{6}$$

Combining equations (4) and (6) to eliminate $\theta$:

$$\sigma = \frac{12MZ}{rh^3 \ln \frac{r_o}{r_i}} \tag{7}$$

By inspection, maximum stress occurs at point A:

$$\sigma_{max} = \frac{6M}{r_i h^2 \ln \frac{r_o}{r_i}} \tag{8}$$

Figure 9:
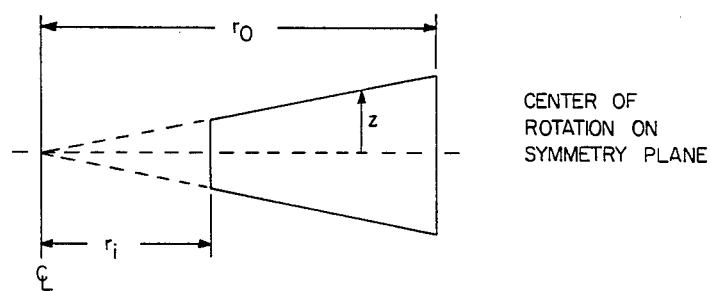

Now, consider a ring having a tapered cross section such that thickness increases with radius: (see FIG. 9).

The height of the upper surface can be expressed by:

$$Z = mr \quad (9)$$

Where m is a constant equal to the slope of the taper.

Therefore, combining equations (4) and (9):

$$\sigma = \frac{E(mr)\theta}{r} = Em\theta \quad (10)$$

This shows that tangential stresses on the upper surface of flanges having a tapered cross section are equalized with respect to radius, rather than varying by the ratio $r_o/r_i$ as with flat flanges having a rectangular cross section.

In order to express $\sigma$ in terms of M for a tapered flange, according to equations (4) and (5):

$$M = \int_{r_i}^{r_o} \int_{-mr}^{mr} \frac{E\theta Z^2}{r} dZ dr = \frac{2}{9} E\theta m^3 (r_o^3 - r_i^3) \quad (11)$$

and combining equations (4) and (11):

$$\sigma = \frac{9MZ}{2m^3 r(r_o^3 - r_i^3)} \quad (12)$$

By inspection, maximum stress occurs uniformly on the upper surface. Combining equations (9) and (12):

$$\sigma_{max} = \frac{9M}{2m^2(r_o^3 - r_i^3)} \quad (13)$$

expresses the maximum stress in the flange.

The volume of material for a flange of rectangular cross section is expressed by:

$$V_{flat} = \pi h(r_o^2 - r_i^2) \quad (14)$$

Similarly, the volume of material for a flange having a tapered, or trapezoidal, cross section is expressed by:

$$V_{taper} = \int_{r_i}^{r_o} 2\pi r(2mr) dr = \frac{4}{3}\pi m(r_o^3 - r_i^3) \quad (15)$$

Combining equations (14) and (15), for a tapered flange and a flat flange incorporating equal amounts of material, the thickness (h) of the flat flange is related to the slope (m) of the tapered flange by:

$$h = \frac{4\pi m(r_o^3 - r_i^3)}{3\pi(r_o^2 - r_i^2)} = \frac{4m(r_o^2 + r_o r_i + r_i^2)}{3(r_o + r_i)} \quad (16)$$

Where the respective inner and outer radii, $r_i$ and $r_o$, of the flanges are the same.

Therefore, combining equations (8), (13) and (16), the ratio of maximum stress between a flat flange and a tapered flange is:

$$\frac{\sigma_{max|flat}}{\sigma_{max|taper}} = \frac{3(r_o - r_i)(r_o + r_i)^2}{4 r_i \ln\left[\frac{r_o}{r_i}\right](r_o^2 + r_o r_i + r_i^2)} \quad (17)$$

For example, in a 2 inch ANSI class 600 flange having an internal diameter of 3.625 inches ($r_o = 3.25$ inches), the ratio of maximum stress according to equation (17) is:

$$\frac{\sigma_{max|flat}}{\sigma_{max|taper}} = 1.32$$

This shows that for a tapered flange and a flat flange having equal amounts of material, the maximum stress is greater in the flat flange. Therefore, a tapered flange utilizing less material than a flat flange can provide the same performance.

While a particular embodiment of the present invention has been shown and described, it will be apparent to those skilled in the art that various changes and modifications may be made without departing from the invention in its broader aspects. Accordingly, the aim in the appended claims is to cover all such changes and modifications which may fall within the true spirit and scope of the invention.

What is claimed is:

1. A hubless flange, that in use does not bear directly on a pipe and does not contact a mating mounting flange or surface of a pipe, having a central opening and an outer periphery, said hubless flange for use with a valve body or the like and having means for engaging the valve body or the like and having a substantially trapezoidal cross section, defined by two tapered sides, that increases as a function of distance from the center of the flange such that the tangential strain generated by forces acting on the flange parallel to the valve body or the like for displaced annular fibers of said flange is substantially equalized.

2. The flange of claim 1, said flange defining a plurality of clamping apertures and strengthened areas of increased cross section surrounding said clamping apertures, said increased cross section being measured relative to adjacent cross sections of said flange between said clamping apertures, said substantially trapezoidal cross section, at least between said clamping apertures, extending from said central opening to said outer periphery.

3. The flange of claim 2 wherein said areas of increased cross section establish flat clamping surfaces around said clamping apertures parallel to the plane of said flange.

4. The flange of claim 3 wherein said flange is ring shaped and said means includes a centrally disposed region for engaging said valve body or the like, said clamping apertures being uniformly displaced about said centrally disposed region.

5. In combination:

a first member having a first plurality of mounting means displaced about a first mating surface;

a second member having a second mating surface for sealing engagement with said first mating surface;

a hubless flange, loosely mounted on said second member, having a corresponding second plurality of mounting means and including means engageable with said second member; and means forcefully joining said mounting means of said first member with said mounting means of said hubless flange without contact between said first mounting means and said hubless flange, said hubless flange urging said second mating surface into sealing engagement with said first mating surface;

said hubless flange having a central opening and an outer periphery and having a substantially trapezoidal cross section, defined by two tapered sides, that increases with increasing distance from its center line whereby tangential strain generated by said forcefully joining means for annular fibers of said hubless flange are radially equalized.

6. The combination of claim 5 wherein said mounting means on said hubless flange comprise mounting holes;

said substantially trapezoidal cross section, at least between said mounting holes, extending from said central opening to said outer periphery;

said hubless flange having strengthened areas of greater cross section surrounding said mounting holes, said greater cross section being measured relative to adjacent cross sections of said flange between said mounting holes.

7. The combination of claim 6, wherein said forcefully joining means includes a plurality of threaded fasteners forcefully urging said flange toward said first member, and wherein said strengthened areas form flat surfaces around said mounting holes against which said threaded fasteners bear.

8. The combination of claim 7 wherein said second member is cylindrical, with a circumferential groove disposed therein, near said first mating surface, and wherein said hubless flange is ring shaped and has a circular inner periphery slightly greater than the diameter of the cylindrical portion of said second member, and wherein said means engageable with said second member includes a recess formed in said inner periphery; and a split key dimensioned to fit in said circumferential groove and nest within said recess for removably attaching said hubless flange to said second member.

9. The combination of claim 5 wherein said mounting means on said hubless flange comprise mounting holes and wherein said flange has a wedge-shaped cross section; and a plurality of wedge-shaped adapters positioned over said holes and providing a loading surface for and normal to said forcefully joining means.

10. A valve body comprising:

a cylindrical portion terminating in a mating surface and having an annular groove therein adjacent to said mating surface;

an annular ring shaped flange having a central opening and an inner and outer periphery and having a recess around its inner periphery positioned on said cylindrical portion;

a circular split key positioned in said annular groove and nesting within said recess for retaining said flange on said body;

said flange defining a plurality of mounting holes for reception of mounting studs and being arranged such that when in use it is not in direct contact with a mating mounting structure located opposite said valve body; and said flange having a substantially trapezoidal cross section that increases with distance from its center line such that the tangential strain generated when the studs are tightened in annular fibers of said flange is substantially equalized throughout said flange, said substantially trapezoidal cross section, at least between said bolt holes, extending from said central opening to said outer periphery.

11. The valve of claim 10, wherein said flange includes areas of increased cross section surrounding said mounting holes defining load surfaces for mounting studs.

12. The valve of claim 11, wherein the taper of the sides of said flange is such that the angle defined thereby has its origin on the center line of said flange, which center line coincides with the centerline of said cylindrical portion.

13. The valve of claim 12, wherein both sides of said flange are tapered outwardly at substantially equal angles.

* * * * *